United States Patent
Park et al.

(10) Patent No.: US 9,304,732 B2
(45) Date of Patent: Apr. 5, 2016

(54) DISPLAY APPARATUS, CONTROL METHOD THEREOF AND DISPLAY SYSTEM

(71) Applicant: Samsung Electronics Co., Ltd., Suwon-si (KR)

(72) Inventors: Sang-jun Park, Suwon-si (KR); Bong-seok Lee, Suwon-si (KR); You-sim Jeong, Suwon-si (KR); Tae-woon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 13/904,701

(22) Filed: May 29, 2013

(65) Prior Publication Data
US 2014/0035795 A1 Feb. 6, 2014

(30) Foreign Application Priority Data
Aug. 2, 2012 (KR) .......................... 10-2012-0084717

(51) Int. Cl.
*G06F 3/14* (2006.01)

(52) U.S. Cl.
CPC ............ *G06F 3/1431* (2013.01); *G06F 3/1446* (2013.01); *G09G 2300/026* (2013.01); *G09G 2370/042* (2013.01)

(58) Field of Classification Search
USPC .......................................... 345/1.3
See application file for complete search history.

(56) References Cited

U.S. PATENT DOCUMENTS

| | | | |
|---|---|---|---|
| 2009/0044116 A1* | 2/2009 | Kitabayashi | 715/716 |
| 2009/0109125 A1* | 4/2009 | Young et al. | 345/1.3 |
| 2011/0122048 A1* | 5/2011 | Choi et al. | 345/1.1 |
| 2011/0216064 A1* | 9/2011 | Dahl et al. | 345/428 |
| 2012/0013523 A1* | 1/2012 | Jaynes | 345/1.3 |
| 2012/0249415 A1* | 10/2012 | Nakajima et al. | 345/156 |
| 2013/0076655 A1* | 3/2013 | Sirpal et al. | 345/173 |
| 2013/0113697 A1* | 5/2013 | Chang | 345/156 |

FOREIGN PATENT DOCUMENTS

| | | |
|---|---|---|
| KR | 10-2004-0076333 A | 9/2004 |
| KR | 10-2009-0124073 A | 12/2009 |

* cited by examiner

*Primary Examiner* — Jason Olson
*Assistant Examiner* — Deeprose Subedi
(74) *Attorney, Agent, or Firm* — Sughrue Mion, PLLC (57) ABSTRACT

A display apparatus of a display system which includes a plurality of display apparatuses including: a display unit; a signal processor which processes an image signal supplied from outside, based on setting information stored in advance in the display apparatus, which displays an image on the display unit based on the processed image signal; a connector which is connected to an external storage device which stores the setting information of the display apparatus; and a controller which, if the external storage device is connected to the connector at a time when the setting information of the display apparatus is initially set, obtains the setting information from the external storage device and stores the setting information in the display apparatus, and updates the setting information stored in the external storage device corresponding to another display apparatus of the plurality of display apparatuses.

17 Claims, 6 Drawing Sheets

DISPLAY APPARATUS, CONTROL METHOD THEREOF AND DISPLAY SYSTEM

CROSS-REFERENCE TO RELATED APPLICATION

This application claims priority from Korean Patent Application No. 10-2012-0084717, filed on Aug. 2, 2012 in the Korean Intellectual Property Office, the disclosure of which is incorporated herein by reference.

BACKGROUND

1. Field

Apparatuses and methods consistent with exemplary embodiments relate to a display apparatus and a control method, which processes an image signal supplied from outside and displays an image based on the processed image signal, and a display system including a plurality of the display apparatuses. More particularly, embodiments relate to a display apparatus and a control method, and a display system which is provided to easily set the system of display apparatuses respectively forming the display system.

2. Description of the Related Art

A related art display apparatus processes image signals/image data, which are input from outside or stored in the display apparatus, according to various processes, and displays an image on a display panel or a screen based on the processed image signals/image data. The related art display apparatus is implemented as various types, including a TV, a monitor and a portable multimedia player.

In a usage environment, such as public or outdoor places where users are at remote places, a large screen is required. Thus, a related art display apparatus with a large panel may be used. However, in the related art, implementing a large screen with a single panel may be difficult due to technology, cost, the environment, etc. To overcome these disadvantages, a plurality of display apparatuses may be arranged in a matrix to implement a single display system. The single display system may be called a video wall.

The respective display apparatuses forming the video wall may receive a same image signal from outside. However, the image signal may be divided and displayed by each display apparatus, such that an image is displayed based on the image signal. In order to divide and display the image signal, the respective display apparatuses may have information set in advance, so that the respective display apparatuses are distinguished from other display apparatuses. Based on the information set in advance, the display apparatuses may determine a part of the image to be displayed, and display the image according to the determination result.

SUMMARY

Exemplary embodiments may provide a display apparatus of a display system which includes a plurality of display apparatuses including: a display unit; a signal processor which processes an image signal supplied from outside, based on setting information stored in advance in the display apparatus, which displays an image on the display unit based on the processed image signal; a connector which is connected to an external storage device which stores the setting information of the display apparatus; and a controller which, if the external storage device is connected to the connector at a time when the setting information of the display apparatus is initially set, obtains the setting information from the external storage device and stores the setting information in the display apparatus, and updates the setting information stored in the external storage device corresponding to another display apparatus of the plurality of display apparatuses.

The setting information may include identification information which is used to identify at least one of the plurality of display apparatuses.

The display apparatus, together with other display apparatuses of the plurality of display apparatuses, forms a video wall, and the signal processor may process the image signal to display on the display unit a part of an image frame displayed in the video wall corresponding to the display apparatus.

The setting information may include location information which indicates a relative arrangement of the display apparatus within the video wall, and the controller may determine the part of the image frame corresponding to the display apparatus, based on the location information stored in the display apparatus.

The setting information may include an IP address, and the controller may configure the display apparatus to access a network with the IP address obtained from the external storage device, and update the setting information by increasing or decreasing a number of the IP address stored in the external storage device.

The controller may do not display the image on the display unit while the setting information is initially set.

The controller may output a preset sound from the display apparatus if the initial setting of the setting information of the display apparatus is complete.

The setting information may include a number value, and the controller may update the setting information by increasing or decreasing the number value of the setting information stored in the external storage device.

Another aspect of the exemplary embodiments may provide a control method of a display apparatus of a display system which includes a plurality of display apparatuses, the control method including: connecting an external storage device, which stores setting information in advance, to a display apparatus; initially setting the setting information of the display apparatus by obtaining the setting information from the external storage device, and storing the setting information in the display apparatus; updating the setting information stored in the external storage device corresponding to another display apparatus of the plurality of display apparatuses; and displaying an image based on an image signal supplied from outside and the setting information stored in the display apparatus.

The setting information may include identification information which is used to identify at least one of the plurality of display apparatuses.

The display apparatus, together with other display apparatuses of the plurality of display apparatuses, forms a video wall, and the displaying the image based on the image signal supplied from the outside may include displaying a part of an image frame displayed in the video wall corresponding to the display apparatus, based on the image signal.

The setting information may include location information which indicates a relative arrangement of the display apparatus within the video wall, and the displaying the image based on the image signal supplied from the outside may further include determining the part of the image frame corresponding to the display apparatus, based on the location information.

The setting information may include an IP address, and the initially setting the setting information of the display apparatus may include configuring the display apparatus to access a network with the IP address obtained from the external storage device, and the updating the setting information stored in the external storage device corresponding to another display apparatus may include updating the setting information by increasing or decreasing a number of the IP address stored in the external storage device.

The initially setting the setting information of the display apparatus may include not displaying the image while the setting information is initially set.

The initially setting the setting information of the display apparatus may include outputting a preset sound if the initial setting of the setting information of the display apparatus is complete.

The setting information may include a number value, and the updating the setting information stored in the external storage device corresponding to another display apparatus may include updating the setting information by increasing or decreasing a number value of the setting information stored in the external storage device.

Another aspect of the exemplary embodiments may provide a display system including: a plurality of display apparatuses; and an external storage device which is connected to the plurality of display apparatuses and stores setting information in advance, corresponding to a first display apparatus of the plurality of display apparatuses, wherein if the external storage device is connected to the plurality of display apparatuses in a case where the setting information of the first display apparatus is initially set, the first display apparatus obtains the setting information from the external storage device and stores the setting information in the first display apparatus, and updates the setting information stored in the external storage device corresponding to the second display apparatus of the plurality of display apparatuses.

The setting information may include identification information which is used to identify at least one of the plurality of display apparatuses.

The plurality of display apparatuses may form a video wall, and the first display apparatus may display a part of an image frame displayed in the video wall corresponding to the first display apparatus, based on the image signal.

The setting information may include at least one of location information which indicates a relative arrangement of the first display apparatus within the video wall, and an IP address of the first display apparatus.

Another aspect of the exemplary embodiments may provide a display apparatus of a display system including: a connector which receives an image signal and setting information from outside; a signal processor which processes the received image signal based on the received setting information; a display unit which displays an image based on the processed image signal; and a controller which obtains the received setting information, stores the received setting information in the display apparatus, and updates the setting information from the outside corresponding to another display apparatus of the display system.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
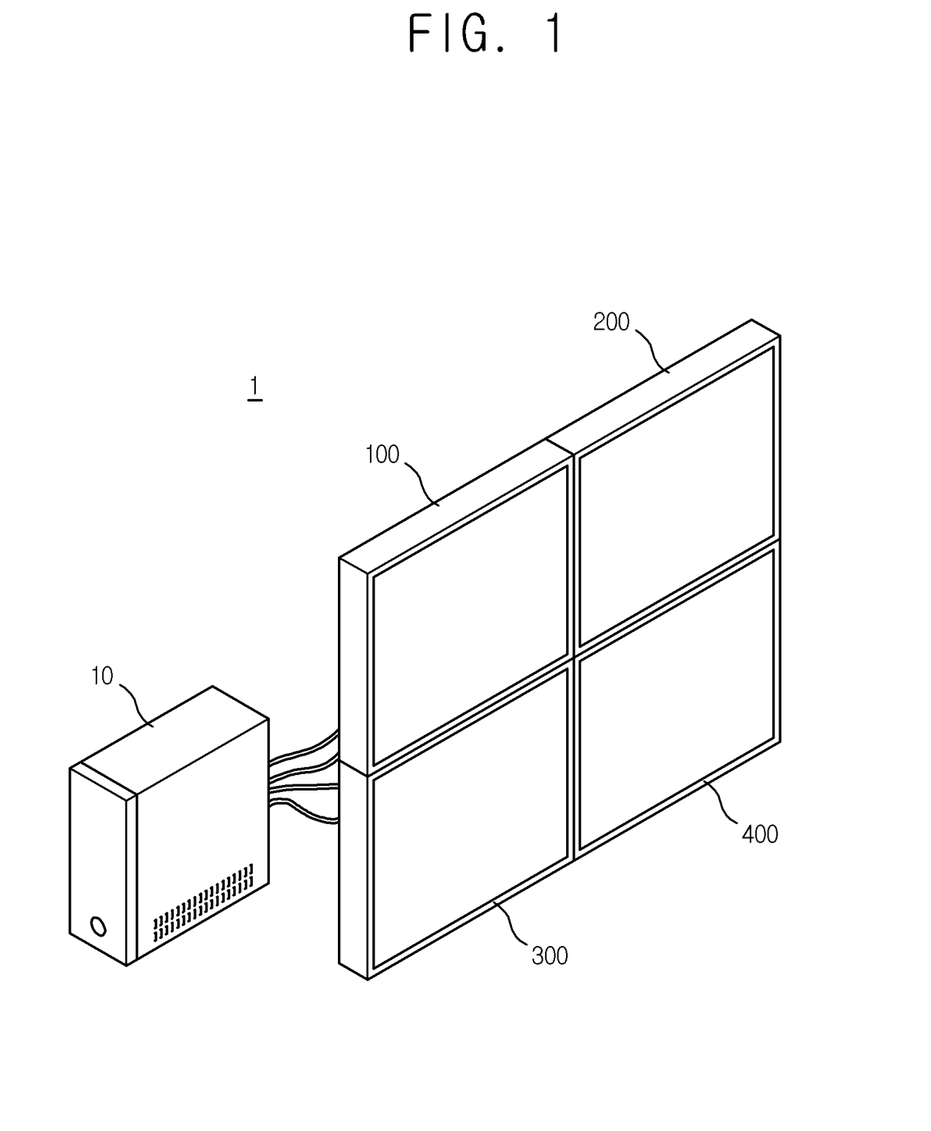
FIG. 1 illustrates an example of a display system according to a first embodiment.

FIG. 1 illustrates an example of a display system 1 according to a first embodiment.

The display system 1 according to the present embodiment includes a plurality of display apparatuses 100, 200, 300 and 400. The display system 1 may further include an image supply source 10, which supplies an image signal to the respective display apparatuses 100, 200, 300 and 400 in a wired/wireless manner. However, the embodiments of the display system 1 are not limited. The display system 1 may include all of the image supply source 10 and the plurality of display apparatuses 100, 200, 300 and 400, or may include a plurality of display apparatuses 100, 200, 300 and 400 receiving an image signal from outside.

According to the present embodiment, the plurality of display apparatuses 100, 200, 300 and 400 form a video wall. There may be several ways to display a predetermined image in a large screen. For example, a single display apparatus including a large panel may display the image. However, in this case it may be difficult to display an image on a screen that is larger than a technologically feasible panel. Further, if the panel becomes too large, there may be a delay in displaying the image on the panel.

The video wall displays an image by arranging a plurality of display apparatuses 100, 200, 300 and 400 in a matrix, rather than a single display apparatus. A single image frame is divided into areas corresponding to the respective display apparatuses 100, 200, 300 and 400. The plurality of display apparatuses 100, 200, 300 and 400 individually display the respective areas of the divided image frame. Then, the display system 1 displays a single image frame in a large screen.

To realize a large screen, the plurality of display apparatuses 100, 200, 300 and 400 are arranged on a wall, or stand on a ground, in parallel with each other. According to the present embodiment, the four display apparatuses 100, 200, 300 and 400 are arranged in a 2×2 matrix. However, this is merely an example, and the number and arrangement of the display apparatuses 100, 200, 300 and 400 may vary.

The plurality of display apparatuses 100, 200, 300 and 400 are arranged in a 2×2 matrix. In a present embodiment, a first display apparatus 100 is arranged in a top left side, a second display apparatus 200 is arranged in a top right side, a third display apparatus 300 is arranged in a bottom left side, and a fourth display apparatus 400 is arranged in a bottom right side.

The image frame is divided into 2×2 areas corresponding to the arrangement of the display apparatuses 100, 200, 300 and 400, and each divided area of the image frame is displayed in the display apparatuses 100, 200, 300 and 400 corresponding to the arrangement of the display apparatus. In other words, of the four divided areas of the image frame, a top left area is displayed by the first display apparatus 100, a top right area is displayed by the second display apparatus 200, a bottom left area is displayed by the third display apparatus 300 and a bottom right area is displayed by the fourth display apparatus 400.

Figure 2:
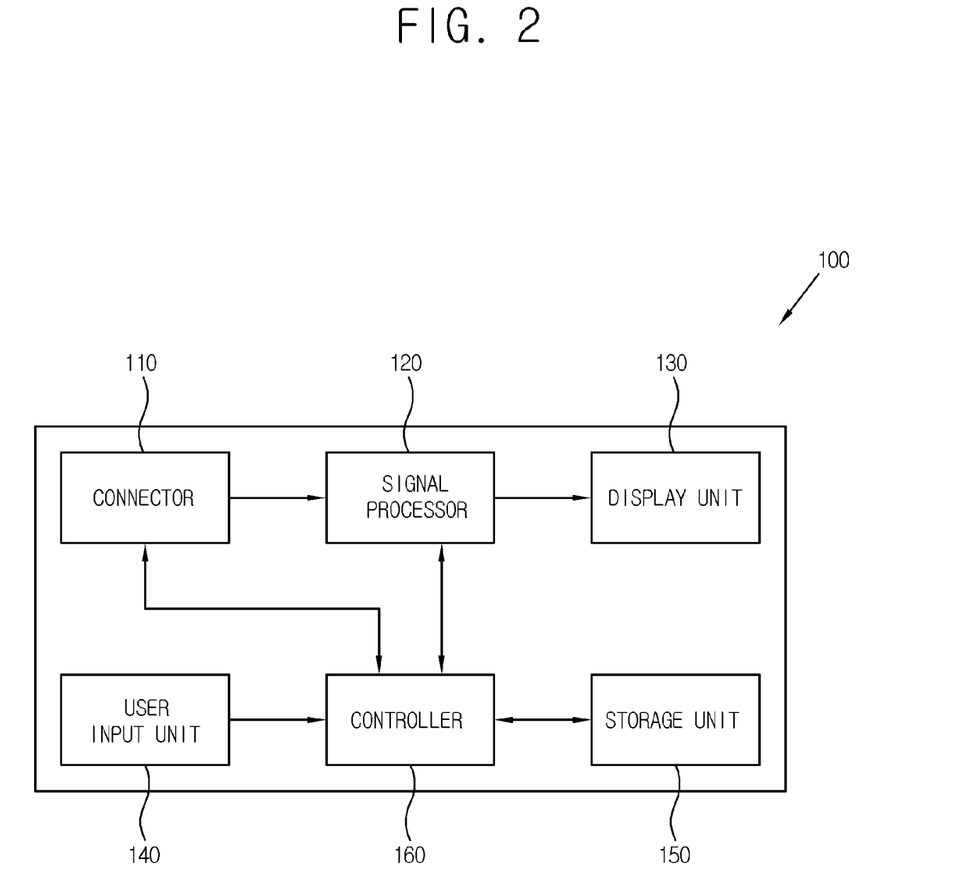
FIG. 2 is a block diagram of a first display apparatus of the display system in FIG. 1.

Hereinafter, a detailed configuration of the display apparatuses 100, 200, 300 and 400 will be described with reference to FIG. 2. FIG. 2 is a block diagram of the first display apparatus 100. According to the present embodiment, the configuration of the first display apparatus 100 will be described. The configuration of the first display apparatus 100 may apply to the second, third and fourth display apparatuses 200, 300 and 300. Thus, detailed description of the display apparatuses 200, 300 and 400 will be omitted.

As shown in FIG. 2, the first display apparatus 100 includes a connector 110 which is an interface connected to an external environment and exchanging signals/data/information with the outside, a signal processor 120 which processes a signal received through the connector 110, according to preset various processes, a display unit 130 which displays an image based on a signal processed by the signal processor in a case that the processed signal is an image signal, a user input unit 140 which is manipulated by a user and outputs a preset command, a storage unit 150 which stores unlimited data/information, and a controller 160 which controls various operations of the first display apparatus 100.

The connector 110 transmits a signal from the outside to the signal processor 120 or the controller 160. The connector 110 is implemented as various types, depending on features and standards of a received signal, an embodiment type of various external devices (not shown) or peripheral devices (not shown) connected to the connector 110, and an embodiment type of the first display apparatus 100. For example, the connector 110 may receive signals/data according to standards such as high definition multimedia interface (HDMI), universal serial bus (USB) and component, and includes at least one connector (not shown) or terminal (not shown) corresponding to the standards.

The connector 110 may transmit information/data/signals from the first display apparatus 100 to the outside, as well as receiving signals from the outside. In other words, the connector 110 is not limited to an element for receiving signals from the outside, and may be implemented as an interface which performs interactive communication.

The connector 110 may include various elements depending on the design of the first display apparatus 100, as well as the connector/terminal which is connected to an external device (not shown) in a wired manner. For example, the connector 110 may include various additional elements, such as a wireless communication module (not shown) to be connected to the external device in a wireless manner, and a tuner (not shown) to tune a broadcasting signal.

The signal processor 120 performs a preset process with respect to a signal received through the connector 110 to process the signal. For example, if a signal received through the connector 110 includes an image signal, the signal processor 120 processes the image signal according to the image processing operation, and outputs the processed signal to the display unit 130 in which an image is displayed on the basis of the processed image signal.

The image processing operation of the signal processor 120 may include, but is not limited to, a de-multiplexing operation for dividing a predetermined signal, a decoding operation corresponding to an image format of an image signal, a de-interlacing operation for converting an interlaced image signal into a progressive image signal, a scaling operation for adjusting an image signal into a preset resolution, a noise reduction operation for improving an image quality, a detail enhancement operation, a frame refresh rate conversion, etc.

If the signal received through the connector 110 includes an audio signal or a data signal, the signal processor 120 performs a processing operation corresponding to the respective signals. The performance of the processing operation by the signal processor 120 may be determined at a time of designing the first display apparatus 100, taking into account features of the signal received through the connector 110.

The signal processor 120 is implemented as an image processing board (not shown) which is formed by mounting various chipsets (not shown), memories (not shown), electronic parts (not shown), wirings (not shown), etc., on a printed circuit board (PCB) (not shown) to perform the foregoing image processing operations.

The display unit 130 displays an image based on an image signal output by the signal processor 120. The display unit 130 may be implemented as various display panels including liquid crystal, plasma, light-emitting diode (LED), organic light-emitting diode (OLED), surface-conduction electron-emitter, carbon nano-tube, and nano-crystal. However, embodiments of display unit are not limited.

The display unit 130 may further include additional elements depending on an embodiment type. For example, the display unit 130, as an LCD type which does not emit light by itself, may include an LCD panel (not shown), a backlight unit (not shown) to emit light to the LCD panel, and a panel driving substrate (not shown) to drive the LCD panel (not shown).

The user input unit 140 outputs preset various control commands, or unlimited information by a user manipulation and input. The user input unit 140 may be implemented as a menu key and an input panel installed in an external part of the display apparatus 100, or a remote controller which is separated/spaced from the display apparatus 100.

The storage unit 150 is implemented as a non-volatile memory, such as a flash memory or a hard disc drive. The storage unit 150 stores various data. The storage unit 150 is accessed by the controller 160, and data stored in the storage unit 150 may be read/recorded/modified/deleted/updated by the controller 160.

If an image signal is transmitted to the connector 110, the controller 160 controls the signal processor 120 to process the image signal, and controls the display unit 130 to display an image on the display unit 130 based on the processed image signal. As the first display apparatus 100 is one of the plurality of display apparatuses 100, 200, 300 and 400 forming the video wall, the controller 160 identifies the first display apparatus 100 of the plurality of display apparatuses 100, 200, 300 and 400 included in the display system 1, and controls the signal processor 120 to display an image on the display unit 130 according to the identification result.

Figure 3:
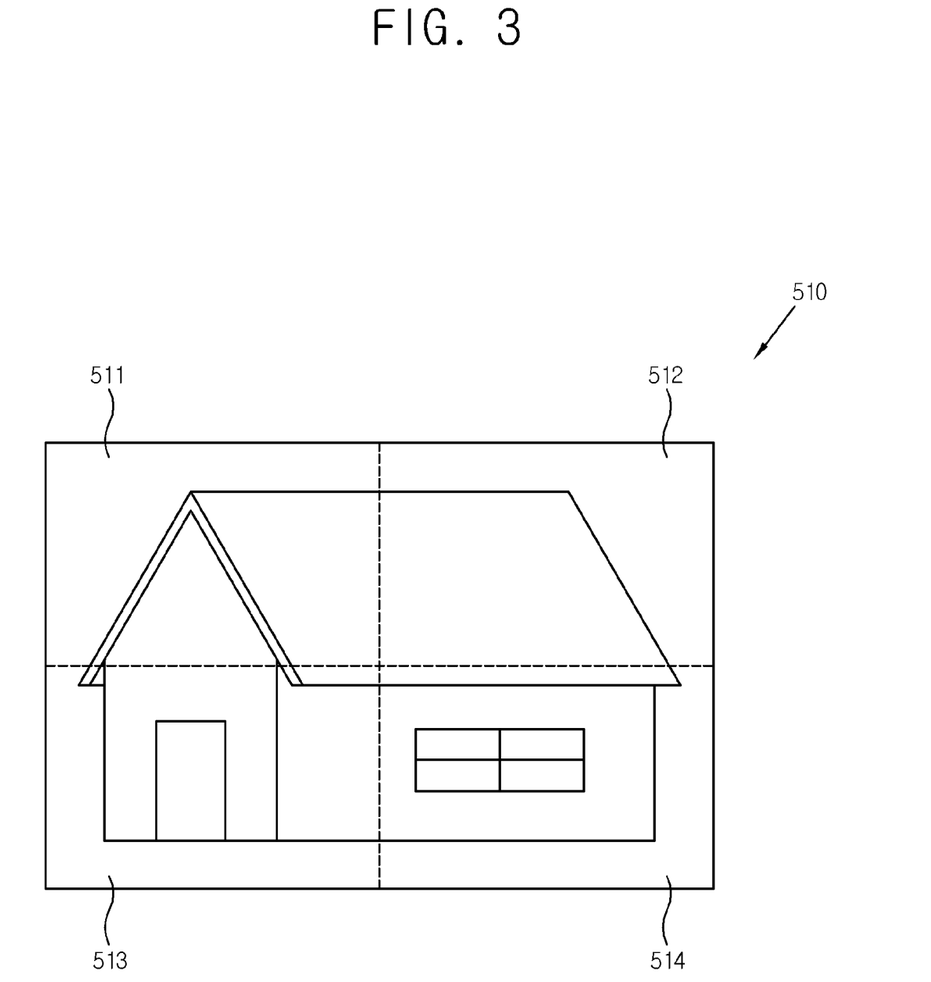
FIG. 3 illustrates an example of a screen of respective display apparatuses of the display system in FIG. 1.

FIG. 3 illustrates an example of a screen of the respective display apparatuses 100, 200, 300 and 400.

As shown therein, an image frame 510 includes a first division image 511 corresponding to the first display apparatus 100, a second division image 512 corresponding to the second display apparatus 200, a third division image 513 corresponding to the third display apparatus 300, and a fourth division image 514 corresponding to the fourth display apparatus 400. In other words, FIG. 3 illustrates the 2×2 arrangement made by the plurality of display apparatuses 100, 200, 300 and 400, according to the present embodiment.

Image signals which are received by the plurality of display apparatuses 100, 200, 300 and 400 are identical. In displaying an image based on the image signal, the controller 160 controls the first division image 511, of the image frame 510, to be displayed by the first display apparatus 100. The controller 160 determines in which location the first display apparatus 100 of the plurality of display apparatuses 100, 200, 300 and 400 is located, or determines which of the division images 511, 512, 513 and 514, of the image frame 510, will be displayed. This determination is made to distinguish the first display apparatus 100, including the controller 160, from other display apparatuses 200, 300 and 400.

The controller 160 refers to setting information stored in advance in the storage unit 150 to make the determination. The setting information is used to identify the first display apparatus 100, of the plurality of display apparatuses 100, 200, 300 and 400, and is used to process an image signal by the signal processor 120. The setting information may include common items with respect to the plurality of display apparatuses 100, 200, 300 and 400, but includes at least one item which distinguishes the first display apparatus 100 from other display apparatuses 200, 300 and 400.

In other words, identification information of the plurality of display apparatuses 100, 200, 300 and 400 includes different information. For example, identification information of the first display apparatus 100 distinguishes the first display apparatus 100 from other display apparatuses 200, 300 and 400.

The stored setting information of the first display apparatus 100 may include the following:

H_n: 2
V_n: 2
P_n: 1
SetIP_n: 10.88.44.101
ServerIP_n: 10.88.44.90

The foregoing items are an example, and do not limit the concept of the present embodiment.

H_n refers to a number of the display apparatuses 100, 200, 300 and 400, which are arranged in a transverse direction of the video wall, while V_n refers to a number of display apparatuses 100, 200, 300 and 400, which are arranged in a vertical direction of the video wall. The video wall is formed by arranging the plurality of display apparatuses 100, 200, 300 and 400 in the 2×2 matrix.

P_n refers to a relative location of the first display apparatus 100, within the video wall. For example, if it is agreed in advance to arrange the image in the sequence from the top left to the bottom right side within the plurality of display apparatuses 100, 200, 300 and 400 arranged in the 2×2 matrix, the first display apparatus 100 is located at a No. 1 location, i.e., in the top left side of the video wall.

SetIP_n refers to an IP address, 10.88.44.101, of the first display apparatus 100 to be connected to an external network.

ServerIP_n refers to an IP address, 10.88.44.90, of a server (not shown) to which the first display apparatus 100 is connected.

Of the foregoing information, the plurality of display apparatuses 100, 200, 300 and 400 has identical values regarding H_n, P_n and ServerIP_n, but has different values regarding P_n and SetIP_n.

Accordingly, the controller 160 may access the setting information stored in the storage unit 150, determine the relative location of the first display apparatus 100 within the video wall based on P_n value, and set the IP address of the first display apparatus 100 based on a SetIP_n value.

The plurality of display apparatuses 100, 200, 300 and 400 forming the display system 1 employ an identical model, and the arrangement of the respective display apparatuses 100, 200, 300 and 400 may vary depending on the implementation method of a user. For example, the device used as the first display apparatus 100 according to the present embodiment may also be used as the second display apparatus 200, the third display apparatus 300 or the fourth display apparatus 400, by a user who initially forms the display system 1.

Accordingly, setting the setting information of the respective display apparatuses 100, 200, 300 and 400 during a manufacturing phase is not preferable from an efficiency perspective. A timing at which the setting information is initially set with respect to the display apparatuses 100, 200, 300 and 400 would preferably be after the display system 1 is formed by the plurality of display apparatuses 100, 200, 300 and 400, and before an image is displayed by the display system 1.

Figure 4:
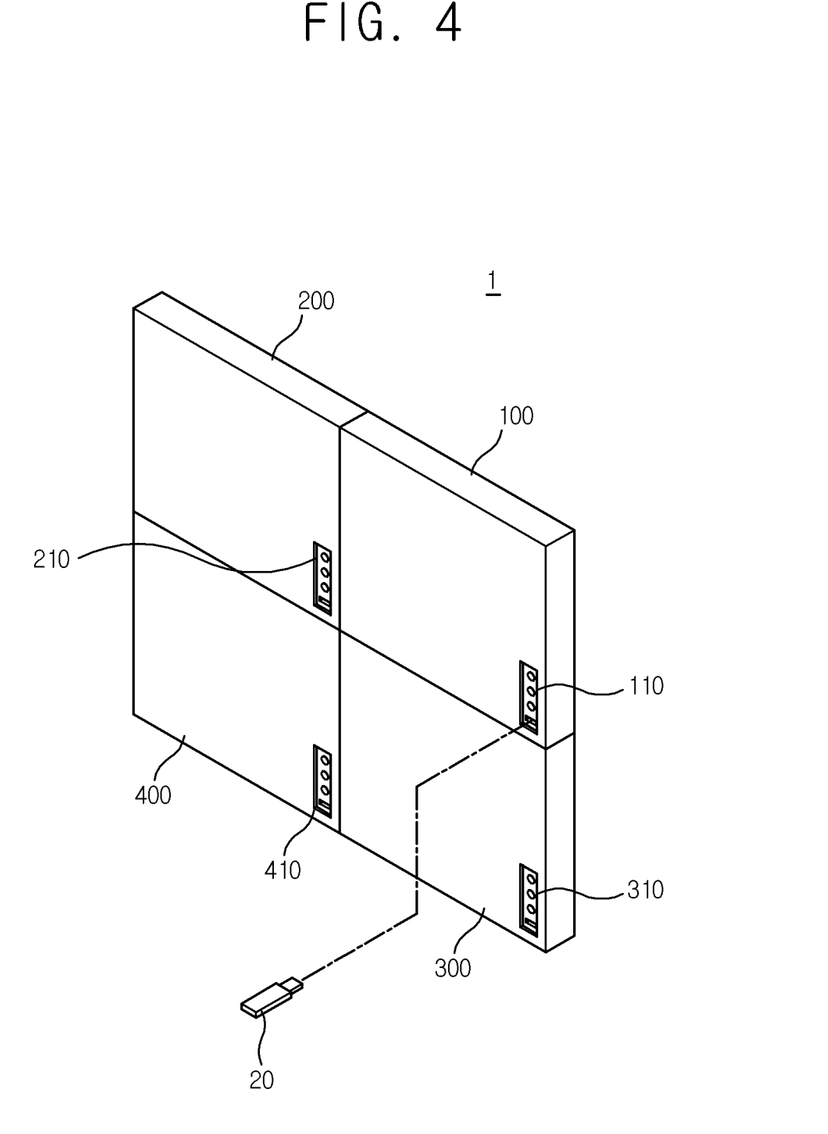
FIG. 4 illustrates an example of a method of initially setting information of the respective display apparatuses of the display system in FIG. 1.

FIG. 4 illustrates an example of a method of initially setting information of the respective display apparatuses 100, 200, 300 and 400.

As shown in FIG. 4, the plurality of display apparatuses 100, 200, 300 and 400 includes connectors 110, 210, 310 and 410, respectively, The respective connectors 110, 210, 310 and 410 may be connected to an external storage device 20 which is implemented as a USB memory.

The external storage device 20 stores setting information of the first display apparatus 100. As shown in FIG. 4, after the video wall is formed by the plurality of display apparatuses 100, 200, 300 and 400, a user connects the external storage device 20 to the connector 110 of the first display apparatus 100 to set setting information of the respective display apparatuses 100, 200, 300 and 400.

The method of storing the setting information of the first display apparatus 100 in the external storage device 20 may vary, e.g., inputting setting information through a computer (not shown).

If the external storage device 20 is connected to the connector 110, the controller 160 of the first display apparatus 100 obtains, and stores in the storage unit 150, the setting information stored in the external storage device 20 to initially set the setting information of the first display apparatus 100.

The setting information of other display apparatuses 200, 300 and 400 may be set by a same method as that of the first display apparatus 100. Further, the setting information of all display apparatuses 100, 200, 300 and 400 forming the display system 1 may be stored in the external storage device 20, and the respective display apparatuses 100, 200, 300 and 400 may selectively obtain setting information from the external storage device 20. However, in this case, the data stored in the external storage device 20 increases. Thus, the selection of the setting information by the display apparatuses 100, 200, 300 and 400 from the external storage device 20 may raise a data storage capacity issue.

A following method is suggested according to the present embodiment.

The external storage device 20 stores the setting information of the first display apparatus 100, of the plurality of display apparatuses 100, 200, 300 and 400 forming the display system 1.

If the external storage device 20 is connected to the connector 110 at the phase of initially setting the setting information, the controller 160 of the first display apparatus 100 obtains the setting information stored in the external storage device 20, and sets the obtained setting information as the setting information of the first display apparatus 100. The controller 160 updates the setting information stored in the external storage device 20 corresponding to the second display apparatus 200.

A user may simply connect the external storage device 20 to the respective connectors 110, 210, 310 and 410 in the order of the first display apparatus 100, the second display apparatus 200, the third display apparatus 300 and the fourth display apparatus 400, to easily set the setting information of the respective display apparatuses 100, 200, 300 and 400.

As a user connects the external storage device 20 to the respective connectors 110, 210, 310 and 410 by this method, there is no need to display an image showing the setting process through the display apparatuses 100, 200, 300 and 400. If the setting of the setting information is completed, the controller 160 may output a sound, such as a beeping sound, to notify a user of completion.

As described above, an order of the respective connectors 110, 210, 310 and 410 is the same as an order agreed in advance. The order agreed to advance may be the order of the top left to the bottom right in the video wall.

Figure 5:
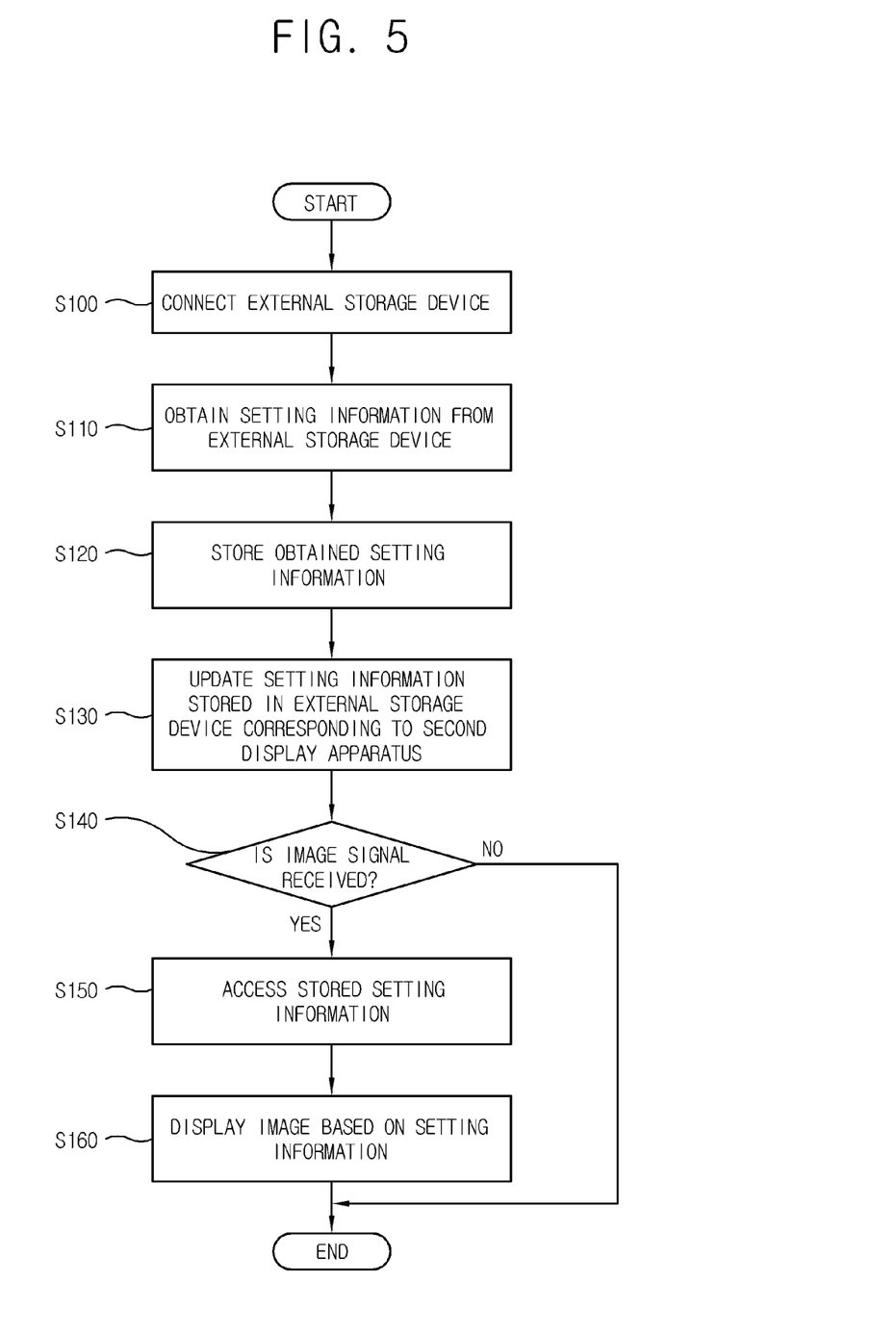
FIG. 5 is a control flowchart showing a process of initially setting information of the first display apparatus of the display system in FIG. 1.

Hereinafter, the method of initially setting the setting information of the first display apparatus 100 according to the present embodiment will be described with reference to FIG. 5. FIG. 5 is a control flowchart showing the setting process. The case where the setting information is not stored in the first display apparatus 100, and the external storage device 20 stores the setting information of the first display apparatus 100 is referred to as the initial state.

As shown in FIG. 5, if the external storage device is connected to the connector 110 (S100), the controller 160 obtains the setting information from the external storage device 20 (S110). The controller 160 stores the obtained setting information, as the setting information of the first display apparatus 100 (S120).

As described above, the setting information of the first display apparatus 100 stored in the external storage device 20 includes the following:

H_n: 2
V_n: 2
P_n: 1
SetIP_n: 10.88.44.101
ServerIP_n: 10.88.44.90

Each item of the setting information has a value defined in advance.

The first display apparatus 100 is arranged in the No. 1 position, in the video wall type display system 1 arranged in the 2×2 matrix, and is set to be connected to a server (not shown) 10.88.44.90 by an IP address 10.88.44.101.

If the setting of the setting information of the first display apparatus 100 is complete, the controller 160 updates the setting information stored in the external storage device 20 corresponding to the second display apparatus 200 (S130).

The updating method may be set in various manners, e.g., the controller 160 updates the setting information by increasing or decreasing the value of P_n and SetIP_n defined in advance, excluding H_n, V_n, ServerIP_n, which are commonly set in the respective display apparatuses 100, 200, 300 and 400. H_n, V_n, P_n, SetIP_n, and ServerIP_n are items of the setting information, stored in the external storage device 20.

For example, in the case of P_n, if the relative location of the display apparatuses 100, 200, 300 and 400 within the video wall is referred to as 1, 2, 3 and 4, the controller 160 may modify the location information of the first display apparatus 100 from 1 to 2.

In the case of SetIP_n, an IP address assigned to a single group like the display system 1 is adjacently assigned. If the IP address assigned to the display system 1 is 10.88.44.101 to 10.88.44.104, the controller 160 may modify the IP address assigned to the first display apparatus 100 from 10.88.44.101 to 10.88.44.102.

By adding a predetermined value to the value representing the location information, or adding a predetermined value to the last digit of the IP address, the controller 160 may update the setting information stored in the external storage device 20 corresponding to the second display apparatus 200.

If the initial setting of the setting information of the first display apparatus 100 is complete, a user may disconnect the external storage device 20 storing the setting information of the second display apparatus 200, from the first display apparatus 100, and connect the external storage device 20 to the second display apparatus 200 to initially set the setting information of the second display apparatus 200.

The method of setting the setting information of the second display apparatus 200 and other display apparatuses 300 and 400 may employ the foregoing method. Thus, detailed description will be omitted.

If an image signal is received from outside (S140), the controller 160 accesses the setting information that has been set and stored at the initial setting phase of the setting information (S150). The controller 160 controls the image signal to display an image based on the setting information (S160).

The display system 1 according to the present embodiment may enable a user to easily perform the initial setting phase of the setting information of the plurality of display apparatuses 100, 200, 300 and 400.

The controller 160 updates the setting information by increasing the number of the setting information, but may also update the setting information by decreasing the number of the setting information.

The display system 1 forms the video wall, but the concept of the embodiment may also apply to a display system 3 which does not form the video wall.

Figure 6:
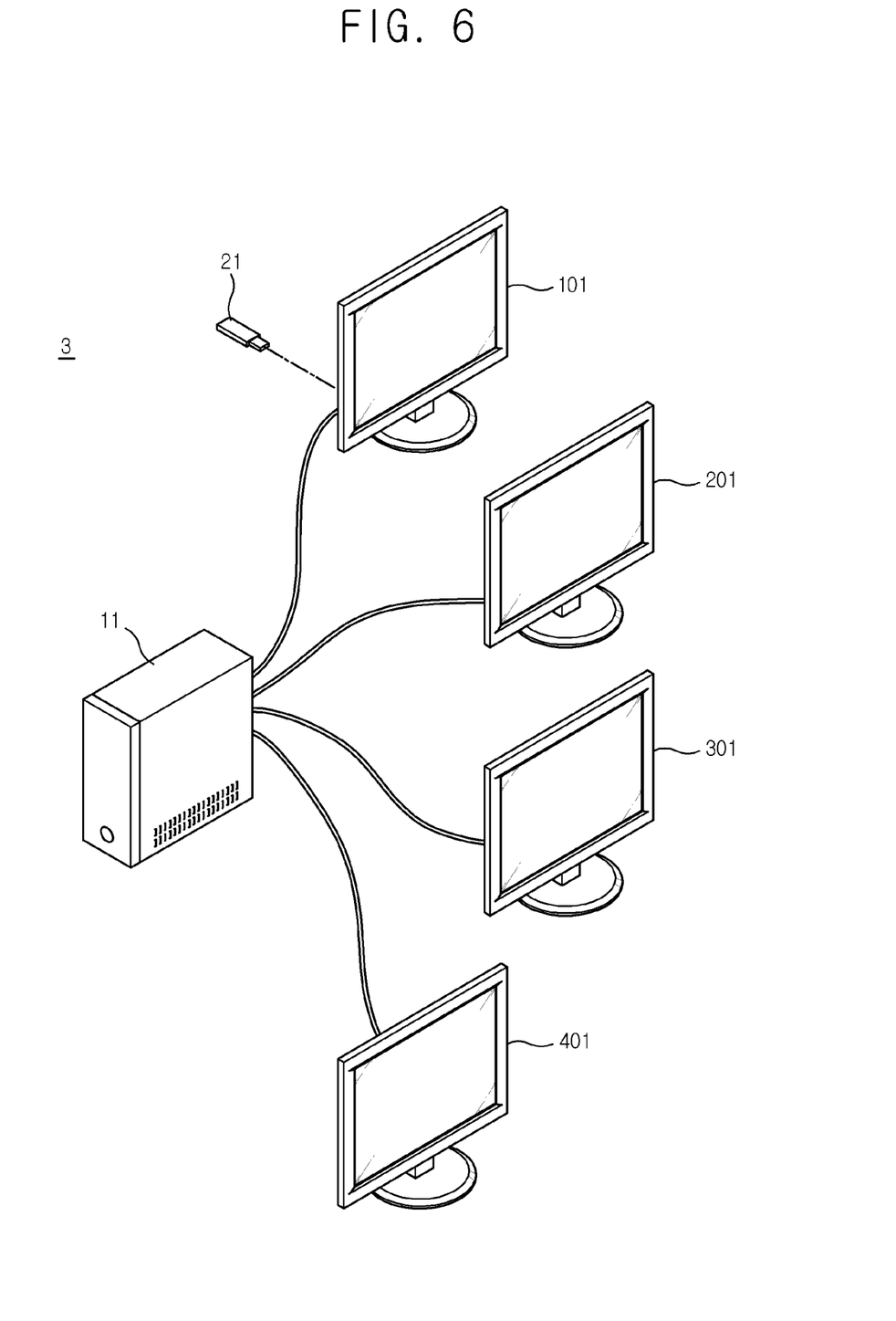
FIG. 6 illustrates an example of a display system according to a second embodiment.

FIG. 6 illustrates an example of the display system 3 according to a second embodiment.

As shown in FIG. 6, the display system 3 includes a plurality of display apparatuses 101, 201, 301 and 401. Unlike the first embodiment, the plurality of display apparatuses 101, 201, 301 and 401 do not form a video wall. The plurality of display apparatuses 101, 201, 301 and 401 may receive an image signal from various types of external device 11, such as a server or an image supply source.

For example, if the external device 11 includes a dynamic host configuration protocol (DHCP), it assigns an IP address to each of the plurality of display apparatuses 101, 201, 301 and 401, so that the respective display apparatuses 101, 201, 301 and 401 may access a network.

However, if the IP is an address described above, it is not easy to assign a particular IP address to a desired display apparatus, among the plurality of display apparatuses 101, 201, 301 and 401.

According to the present embodiment, the particular IP address may be assigned to the respective display apparatuses 101, 201, 301 and 401 by a method which is similar to the first embodiment.

For example, the IP addresses assigned to the plurality of display apparatuses 101, 201, 301 and 401 are 10.88.44.101 to 10.88.44.104. The IP address 10.88.44.101 is assigned to the first display apparatus 101, the IP address 10.88.44.102 is assigned to the second display apparatus 201, the IP address 10.88.44.103 is assigned to the third display apparatus 301, and the IP address 10.88.44.104 is assigned to the fourth display apparatus 401.

A second storage device 21 stores the value of 10.88.44.101, which is the IP address corresponding to the first display apparatus 101. A user connects the external storage device 21 to the first display apparatus 101.

The first display apparatus 101 obtains the value 10.88.44.101 from the external storage device 21, and sets the value as the IP address of the first display apparatus 101. The first display apparatus 101 updates the value 10.88.44.101 stored in the external storage device 21 to the value 10.88.44.102, which is the IP address corresponding to the second display apparatus 201.

A user disconnects the external storage device 21 from the first display apparatus 101, and connects the external storage device 21 to the second display apparatus 201.

The second display apparatus 201 obtains the value of 10.88.44.102 from the external storage device 21, and sets the value as the IP address of the second display apparatus 201. The second display apparatus 201 updates the value 10.88.44.102 stored in the external storage device 21 to the value 10.88.44.103, which is the IP address corresponding to the third display apparatus 301.

Setting the IP address of the third and fourth display apparatuses 301 and 401 is performed by a similar method.

In the display system 3, which is not formed as a video wall, a user may initially set the setting information of the respective display apparatuses 101, 201, 301 and 401 without difficulty.

Although a few exemplary embodiments have been shown and described, it will be appreciated by those skilled in the art that changes may be made in these exemplary embodiments without departing from the principles and spirit of the embodiments, the range of which is defined in the appended claims and their equivalents.

What is claimed is:

1. A display apparatus for forming a video wall system comprising the display apparatus and other display apparatuses, the display apparatus comprising:
    a display;
    a signal processor configured to process an image signal supplied from outside, based on setting information stored in advance in the display apparatus, which displays an image on the display based on the processed image signal;
    a connector configured to be connected to an external storage device which stores the setting information of the display apparatus;
    a controller, in response to the external storage device being connected to the connector, configured to obtain the setting information from the external storage device as the setting information of the display apparatus, configured to perform setting to display a first video wall image of the video wall system based on the obtained setting information and configured to change the setting information stored in the external storage device based on the performed setting so that at least one of the other display apparatuses performs setting to display a second video wall image of the video wall system using the changed setting information; and
    a housing configured to accommodate the display, the signal processor, the connector and the controller therein,
    wherein the setting information stored in the external storage device comprises information on overall arrangement of the display apparatus and other display apparatuses forming the video wall system and a relative location of the display apparatus in the overall arrangement within the video wall system.

2. The display apparatus according to claim 1, wherein the signal processor processes the image signal to display on the display a part of an image frame displayed in the video wall system corresponding to the display apparatus.

3. The display apparatus according to claim 2, wherein the controller determines the part of the image frame corresponding to the display apparatus based on the location information stored in the display apparatus.

4. The display apparatus according to claim 1, wherein the setting information stored in the external storage device further comprises a first IP address for the display apparatus to be connected to an external network and a second IP address of a server to which the display apparatus is connected, and
    the controller configures the display apparatus to access a network with the first IP address obtained from the external storage device, and changes the setting information by increasing or decreasing a number of the first IP address stored in the external storage device.

5. The display apparatus according to claim 1, wherein the controller does not display the image on the display while the setting information is initially set.

6. The display apparatus according to claim 5, wherein the controller outputs a preset sound from the display apparatus if the initial setting of the setting information of the display apparatus is complete.

7. The display apparatus according to claim 1, wherein the setting information comprises a number value, and the controller changes the setting information by increasing or decreasing the number value of the setting information stored in the external storage device.

8. A control method of a display apparatus for forming a video wall system comprising the display apparatus and other display apparatuses, the control method comprising:
    connecting an external storage device to a display apparatus, the external storage device storing setting information in advance;
    initially setting the setting information of the display
    obtaining the setting information from the external storage device;
    setting to display a first video wall image of the video wall system based on the obtained setting information;
    changing the setting information stored in the external storage device based on the performed setting so that at least one of the other display apparatuses performs setting to display a second video wall image of the video wall system using the changed setting information; and
    displaying the first video wall image based on an image signal supplied from outside and the setting based on the obtained setting information,
    wherein the connecting and external storage device, obtaining the setting information, setting to display the first video wall image, changing the setting information stored in the external storage device, and the displaying the first video wall image are performed in the display apparatus, and
    wherein the setting information stored in the external storage device comprises information on overall arrangement of the display apparatus and other display apparatuses forming the video wall system and a relative location of the display apparatus in the overall arrangement within the video wall system.

9. The control method according to claim 8, wherein the displaying the image based on the image signal supplied from the outside comprises displaying a part of an image frame displayed in the video wall system corresponding to the display apparatus, based on the image signal.

10. The control method according to claim 9, wherein the displaying the image based on the image signal supplied from the outside further comprises determining the part of the image frame corresponding to the display apparatus, based on the location information.

11. The control method according to claim 8, wherein the setting information stored in the external storage device further comprises a first IP address for the display apparatus to be connected to an external network and a second IP address of a server to which the display apparatus is connected, and the initially setting the setting information of the display apparatus comprises configuring the display apparatus to access a network with the first IP address obtained from the external storage device, and the updating the setting information stored in the external storage device corresponding to another display apparatus comprises updating the setting information by increasing or decreasing a number of the first IP address stored in the external storage device.

12. The control method according to claim 8, wherein the initially setting the setting information of the display apparatus comprises not displaying the image while the setting information is initially set.

13. The control method according to claim 8, wherein the initially setting the setting information of the display apparatus comprises outputting a preset sound if the initial setting of the setting information of the display apparatus is complete.

14. The control method according to claim 8, wherein the setting information comprises a number value, and the updating the setting information stored in the external storage device corresponding to another display apparatus comprises updating the setting information by increasing or decreasing a number value of the setting information stored in the external storage device.

15. A display system comprising:
    a video wall system formed by a plurality of display apparatuses; and
    an external storage device configured to be connected to one of the plurality of display apparatuses and configured to store setting information in advance, corresponding to a first display apparatus of the plurality of display apparatuses,
    wherein, in response to the external storage device being connected to the first display apparatus, the first display apparatus obtains the setting information from the external storage device as the setting information of the first display apparatus, performs setting to display a first video wall image of the video wall system based on the setting information, and changes the setting information stored in the external storage device based on the performed setting so that the second display apparatus performs setting to display a second video wall image of the video wall system,
    wherein each of the plurality of display apparatuses comprises a display, a signal processor to process an image signal, a connector configured to be connected to the external storage device, a controller configured to perform setting to display the first video wall image, obtain the setting information, and change the setting information stored in the external storage device, and a housing configured to accommodate the display, the signal processor, the connector and the controller therein, and
    wherein the setting information stored in the external storage device comprises information on overall arrangement of the plurality of display apparatuses in the video wall system and a relative location of the display apparatus in the overall arrangement within the video wall system.

16. The display apparatus according to claim 1, wherein the external storage device stores a first identification information, and
    wherein the controller obtains the first identification information from the external storage device stores as the setting information of the display apparatus, changes the setting first identification information stored in the external storage device into a second identification information different from the first identification information, so that another display apparatus of the plurality of display apparatuses obtains the second identification information when the external storage device is connected to the another display apparatus thereafter.

17. The display apparatus according to claim 1, wherein the overall arrangement includes a number of the display apparatuses which are arranged in a transverse direction and in a vertical direction of the video wall system.

* * * * *